(12) United States Patent
Glugla et al.

(10) Patent No.: US 9,702,307 B2
(45) Date of Patent: Jul. 11, 2017

(54) METHOD FOR CONTROLLING FUEL PRESSURE FOR A LPG ENGINE

(71) Applicant: Ford Global Technologies, LLC, Dearborn, MI (US)

(72) Inventors: Chris Paul Glugla, Macomb, MI (US); Gopichandra Surnilla, West Bloomfield, MI (US); Eric Warren Curtis, Milan, MI (US); John Hedges, Canton, MI (US); Mark Allen Dearth, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 554 days.

(21) Appl. No.: 14/019,445

(22) Filed: Sep. 5, 2013

(65) Prior Publication Data

US 2015/0059687 A1    Mar. 5, 2015

(51) Int. Cl.
*F02D 41/00* (2006.01)
*F02D 41/38* (2006.01)

(52) U.S. Cl.
CPC ..... *F02D 41/0025* (2013.01); *F02D 41/0027* (2013.01); *F02D 41/3845* (2013.01); *F02D 2200/0602* (2013.01); *F02D 2200/0606* (2013.01)

(58) Field of Classification Search
CPC .... F02D 41/00; F02D 41/0025; F02D 19/061; F02D 19/0665; F02D 19/0692; F02D 19/0694; F02D 19/081; F02D 19/084; Y02T 10/16; Y02T 10/121; Y02T 10/123; Y02T 10/36

USPC ........... 123/1 A, 27 GE, 299–304, 445, 464, 123/525–527, 575–578; 701/103, 104
See application file for complete search history.

(56) References Cited

U.S. PATENT DOCUMENTS

| 4,483,303 | A | * | 11/1984 | Ishikawa et al. ............ 123/527 |
| 4,703,741 | A | * | 11/1987 | Curran et al. ................ 123/557 |
| 5,816,228 | A | * | 10/1998 | McCandless .......... F02M 45/12 123/575 |
| 6,095,101 | A | * | 8/2000 | Pedersen .................. 123/27 GE |
| 7,870,849 | B2 | * | 1/2011 | Ceratto ......................... 123/527 |
| 8,412,438 | B2 | * | 4/2013 | Carter .......................... 701/103 |
| 8,439,016 | B2 | * | 5/2013 | Carter .......................... 123/462 |

(Continued)

FOREIGN PATENT DOCUMENTS

| EP | 2037115 A1 | 3/2009 |
| WO | 8303120 A1 | 3/1983 |

OTHER PUBLICATIONS

Badillo, Ed et al., "Method and System for Engine Control," U.S. Appl. No. 13/841,611, filed Mar. 15, 2013, 38 pages.

(Continued)

*Primary Examiner* — John Kwon
*Assistant Examiner* — Johnny H Hoang
(74) *Attorney, Agent, or Firm* — Julia Voutyras; McCoy Russell LLP

(57) ABSTRACT

Methods and systems are provided for adjusting a phase of gaseous fuel delivered to fuel injectors of a fuel delivery system. In one example, a method may include adjusting a fuel pressure in a fuel delivery system to deliver fuel in each of a liquid and a gaseous phase during different engine operating conditions. The fuel pressure may be based on a temperature, composition, and desired phase of the fuel.

19 Claims, 4 Drawing Sheets

(56) References Cited

U.S. PATENT DOCUMENTS

| | | |
|---|---|---|
| 8,443,783 B2 * | 5/2013 | Miersch-Wiemers ........ 123/431 |
| 8,443,785 B2 | 5/2013 | Carter |
| 2001/0045208 A1 * | 11/2001 | Kojima ................ B60K 15/077 |
| | | 123/510 |
| 2002/0189589 A1 * | 12/2002 | Kato ...................... F02M 21/08 |
| | | 123/458 |
| 2009/0037076 A1 * | 2/2009 | Oshihara et al. ............. 701/103 |
| 2009/0088983 A1 * | 4/2009 | Bauer et al. .................... 702/24 |
| 2010/0192879 A1 * | 8/2010 | Pursifull ............... F02D 19/081 |
| | | 123/3 |
| 2011/0290203 A1 * | 12/2011 | Pursifull ............. F02D 19/0605 |
| | | 123/41.08 |
| 2012/0041665 A1 * | 2/2012 | Pursifull et al. ............. 701/103 |
| 2012/0048242 A1 * | 3/2012 | Surnilla et al. ............... 123/497 |
| 2012/0186228 A1 | 7/2012 | Yacoub |
| 2012/0214663 A1 | 8/2012 | Chigapov et al. |
| 2013/0160745 A1 * | 6/2013 | Kawaguchi et al. ......... 123/515 |
| 2013/0192562 A1 * | 8/2013 | Matsumura ................... 123/445 |
| 2013/0238217 A1 | 9/2013 | Nolan et al. |

OTHER PUBLICATIONS

Dearth, Mark Allen et al., "Direct Injection of Diluents or Secondary Fuel in Gaseous Fuel Engines," U.S. Appl. No. 13/889,047, filed May 7, 2013, 46 pages.

* cited by examiner

METHOD FOR CONTROLLING FUEL PRESSURE FOR A LPG ENGINE

BACKGROUND/SUMMARY

Alternate fuels have been developed to mitigate the rising prices of conventional fuels and for reducing exhaust emissions. For example, some gaseous fuels have been recognized as attractive alternative fuels. For automotive applications, natural gas or petroleum gas may be compressed and stored as a liquid (liquefied petroleum gas, or LPG) in cylinders at saturation pressure. LPG predominantly consists of butane and propane, although the exact ratio may vary. LPG may be used with a direct injection and/or port injection fuel system. Under certain engine operating conditions, LPG injected from a fuel delivery system may be desired in either a liquid or a gaseous phase. However, as the temperature of the fuel in the fuel system changes, the LPG may be delivered to engine cylinders (e.g., combustion chambers) and/or fuel ports in an undesired phase. For example, the LPG may be in a liquid phase when a gaseous phase is required.

Other attempts to address maintain LPG in a desired phase include utilizing separate gaseous and liquid LPG storage tanks or adjust fuel delivery system parameters to maintain the LPG in one phase. One example approach is shown by Carter et al. in U.S. Pat. No. 8,443,785. Therein, a pump in the LPG fuel system is controlled to maintain the LPG in the liquid phase.

However, the inventors herein have recognized potential issues with such systems. As one example, under some engine operating conditions, LPG may be desired in the gaseous phase instead of the liquid phase. For example, during cold start conditions, LPG may be desired in the gaseous phase in order to reduce particulate matter, or soot formation. Thus, the system described above only provides a method for maintaining the LPG in a single liquid phase.

In one example, the issues described above may be addressed by a method for adjusting a fuel pressure in a fuel delivery system to deliver fuel in each of a liquid and a gaseous phase during different engine operating conditions. The fuel pressure may be based on a temperature, pressure in the cylinder in which fuel is injected into, and a desired phase of the fuel. In one example, the fuel is a gaseous fuel such as LPG. Adjusting the fuel pressure may include adjusting operation of a fuel pump in the fuel delivery system to deliver fuel to fuel injectors at the fuel pressure. For example, during a first condition such as a charge air temperature above a threshold, the fuel pump may be adjusted to increase the fuel pressure above a threshold pressure to transition from delivering the fuel in the gaseous phase to delivering the fuel in the liquid phase. During a second condition such as a cold start condition, the fuel pump may be adjusted to decrease the fuel pressure below the threshold pressure to transition from delivering the fuel in the liquid phase to the gaseous phase. In this way, LPG injected from the fuel delivery system may be injected in a liquid phase during a first set of engine operating conditions and injected in a gaseous phase during a second set of engine operating conditions. As a result, LPG delivered to engine cylinders may be maintained in a desired phase and transitioned between phases to increase engine efficiency and control and reduce engine emissions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
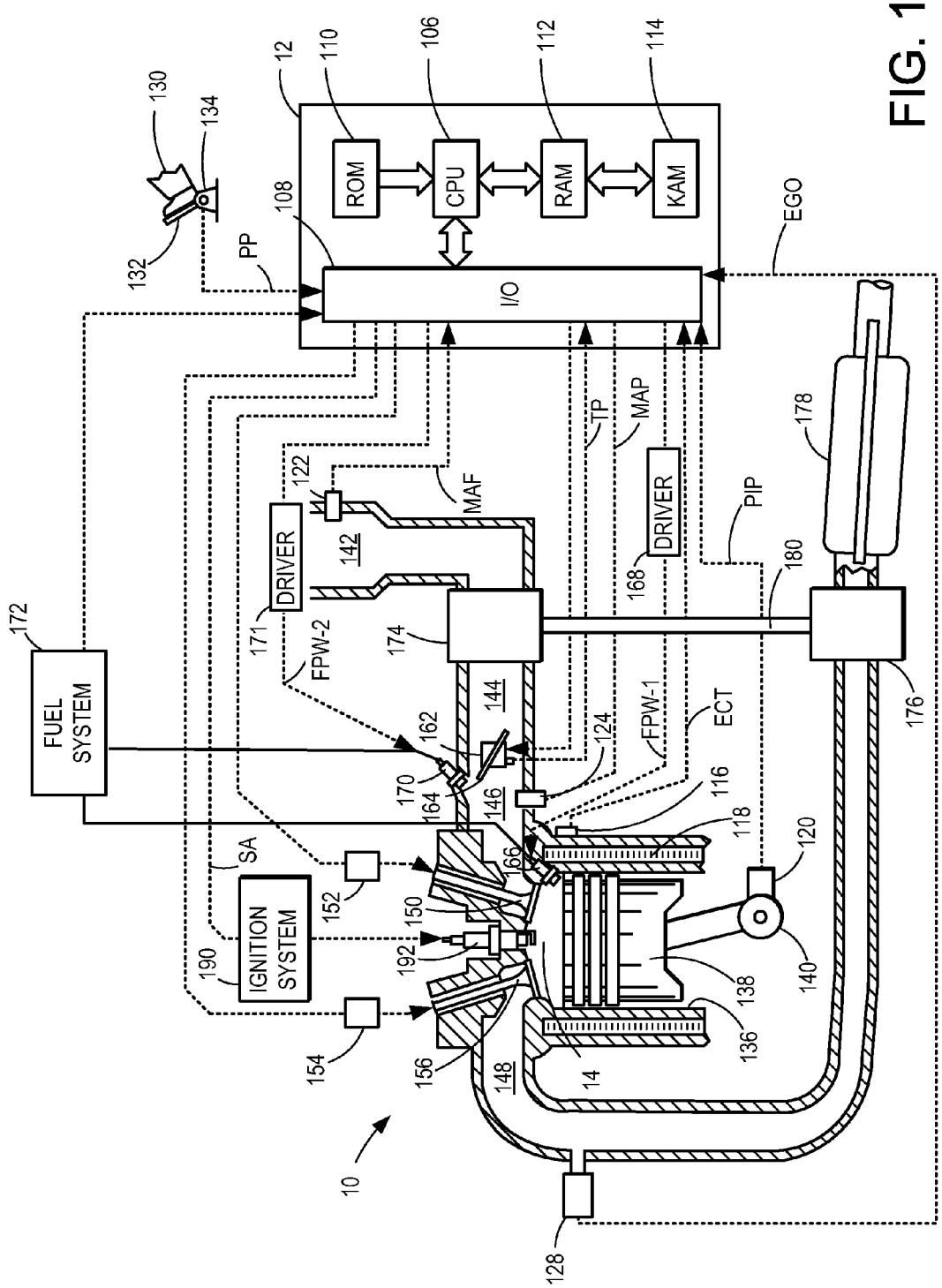
FIG. 1 is a schematic depiction of an engine system configured to operate on a gaseous fuel.
Figure 2:
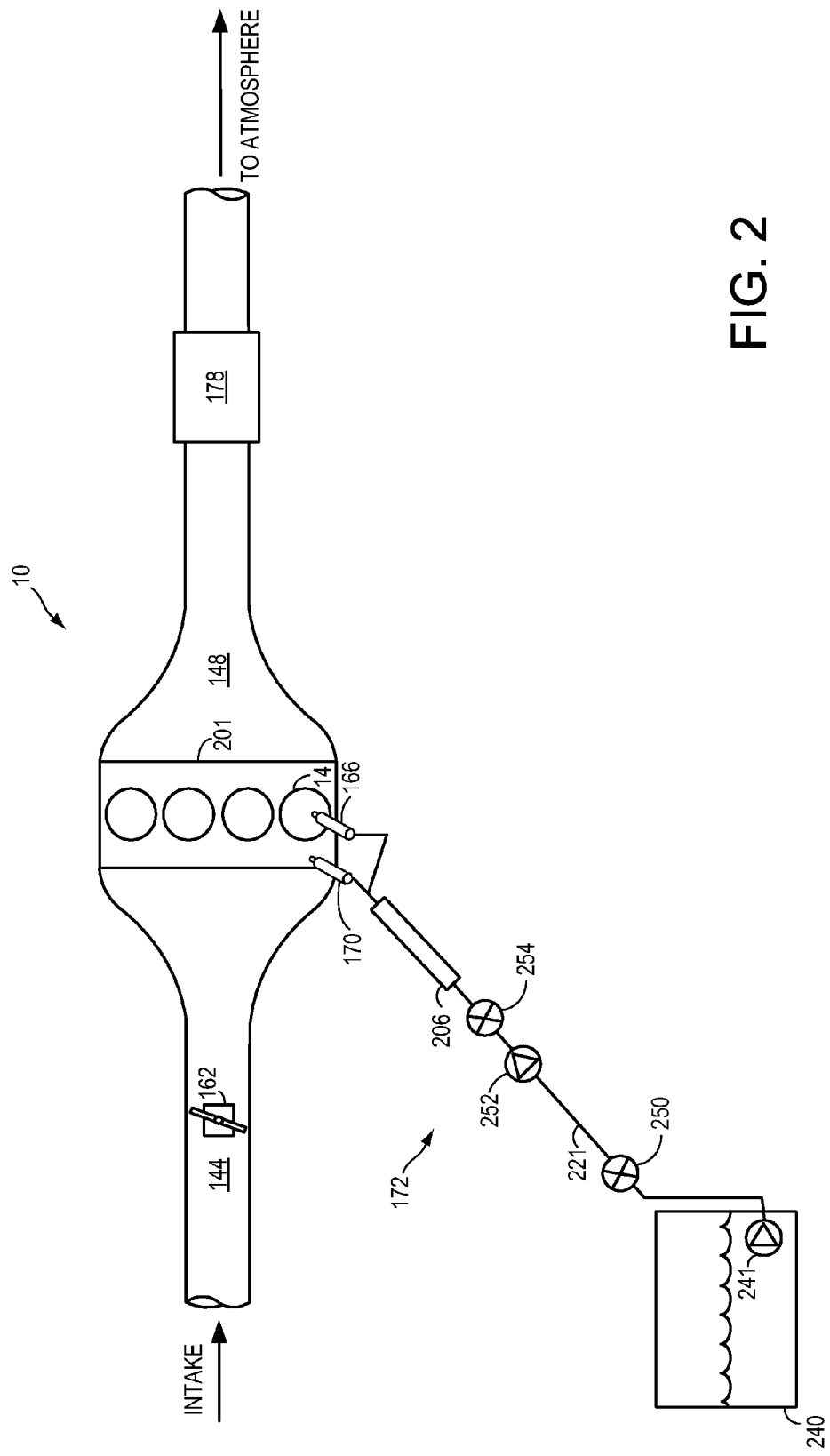
FIG. 2 is a schematic depiction of a multi-cylinder engine configured to operate on a gaseous fuel.
Figure 3:
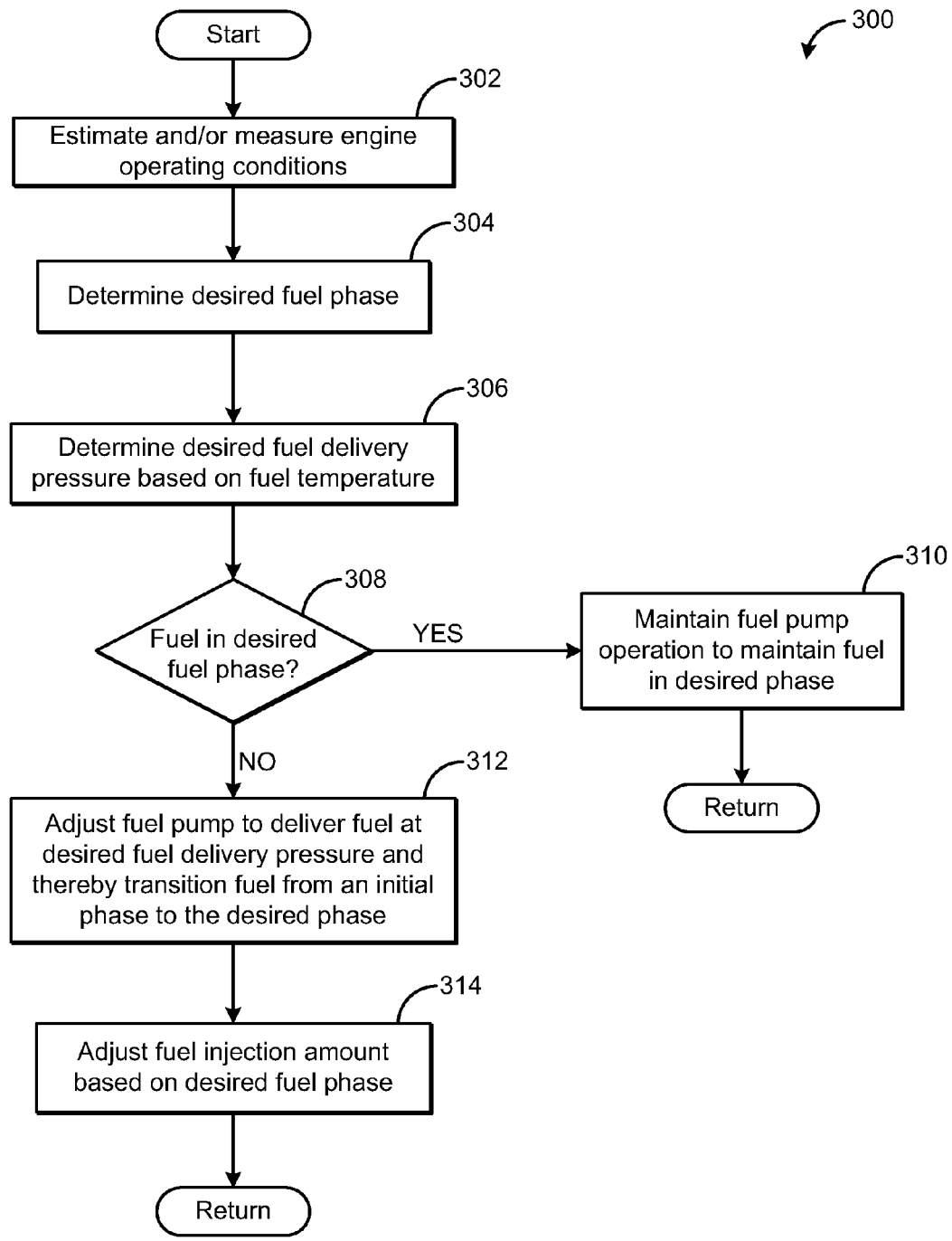
FIG. 3 is a flow chart of a method for adjusting a fuel phase of a gaseous fuel based on engine operating conditions.
Figure 4:
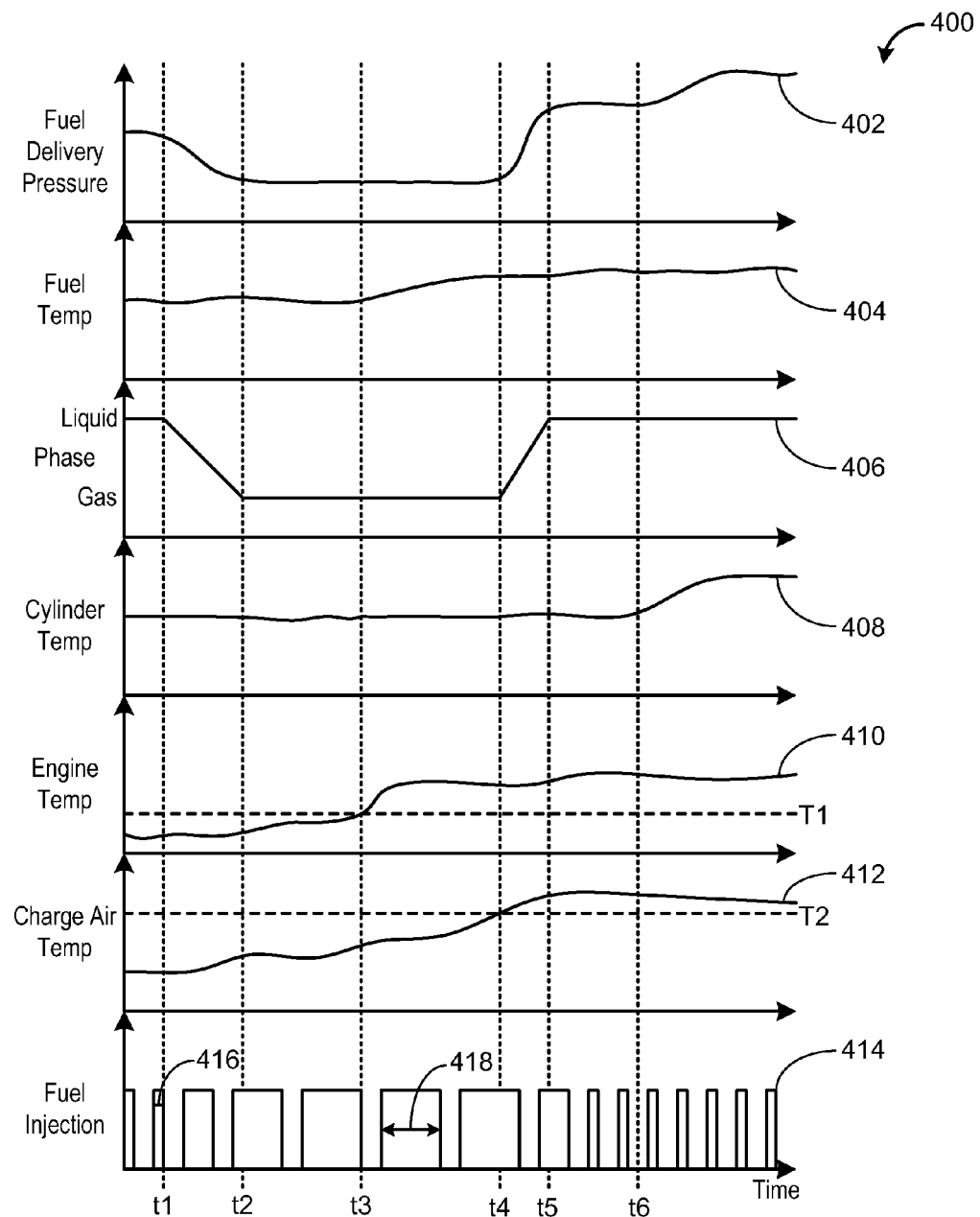
FIG. 4 is a graphical example of adjusting fuel delivery pressure to deliver gaseous fuel in a desired phase based on engine operating conditions.

The following description relates to systems and methods for adjusting a phase of gaseous fuel delivered to fuel injectors of a fuel delivery system, such as the fuel delivery system shown in FIGS. 1-2. The phase of the gaseous fuel is based on the fuel pressure in the fuel delivery system. By adjusting operation of a fuel pump in the fuel delivery system, the fuel pressure may be adjusted in order to deliver the fuel to fuel injectors in the desired phase. FIG. 3 shows a method for adjusting the fuel phase of the gaseous fuel based on engine operating conditions. During a first set of engine operating conditions, the fuel may be delivered to fuel injectors in a gaseous phase. During a second set of engine operating conditions, the fuel may be delivered to fuel injectors in a liquid phase. FIG. 4 shows examples of adjusting a fuel delivery pressure to deliver the gaseous fuel to fuel injectors in the desired phase based on engine operating conditions. In one example, the first set of engine operating conditions may include an engine temperature below a threshold temperature and the second set of engine operating conditions may include a charge air temperature above a threshold temperature. Adjusting the phase of the fuel in this way may increase engine efficiency while also reducing particulate matter production and engine knock.

FIG. 1 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (i.e. combustion chamber) 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or may alternatively be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to cylinder 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including two fuel injectors 166 and 170. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from fuel system 172 including a fuel tank, fuel pumps, a fuel rail, and driver 168. In one example, fuel system 172 may be a high pressure fuel system. Alternatively, fuel may be delivered by a single stage fuel pump at lower pressure, in which case the timing of the direct fuel injection may be more limited during the compression stroke than if a high pressure fuel system is used. Further, while not shown, the fuel tank may have a pressure transducer providing a signal to controller 12. Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel in proportion to the pulse width of signal FPW-2 received from controller 12 via electronic driver 171. Fuel may be delivered to fuel injector 170 by fuel system 172.

Fuel may be delivered by one or both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions. In another example, fuel may be delivered only be the fuel injector 166. In some embodiments, the engine may only include one of a direct injection or port injection fuel system.

As described above, FIG. 1 shows only one cylinder of a multi-cylinder engine. As such each cylinder may similarly include its own set of intake/exhaust valves, fuel injector(s), spark plug, etc.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed. An example routine that may be performed by the controller is described at FIG. 3.

FIG. 2 shows a schematic diagram of a multi-cylinder engine in accordance with the present disclosure. As depicted in FIG. 1, internal combustion engine 10 includes cylinders 14 coupled to intake passage 144 and exhaust passage 148. Intake passage 144 may include throttle 162. Exhaust passage 148 may include emissions control device 178.

Cylinders 14 may be configured as part of cylinder head 201. In FIG. 2, cylinder head 201 is shown with 4 cylinders in an inline configuration. In some examples, cylinder head 201 may have more or fewer cylinders, for example six cylinders. In some examples, the cylinders may be arranged in a V configuration or other suitable configuration.

Cylinder head 201 is shown coupled to fuel system 172. Cylinder 14 is shown coupled to fuel injectors 166 and 170. Although only one cylinder is shown coupled to fuel injectors, it is to be understood that all cylinders 14 included in cylinder head 201 may also be coupled to one or more fuel injectors. In this example embodiment, fuel injector 166 is depicted as a direct fuel injector and fuel injector 170 is depicted as a port fuel injector. Each fuel injector may be configured to deliver a specific quantity of fuel at a specific time point in the engine cycle in response to commands from controller 12. One or both fuel injectors may be utilized to deliver combustible fuel to cylinder 14 during each combustion cycle. The timing and quantity of fuel injection may be controlled as a function of engine operating conditions. Control of the timing and quantity of fuel injection will be discussed further below and with regards to FIGS. 3-4. In the embodiment shown in FIGS. 1-2, the engine 10 includes both a direct fuel injector 166 and a port fuel injector 170. However, in alternate embodiments, the engine 10 may include only one of the direct fuel injector 166 or the port fuel injector 170. For example, the engine 10 may include only direct fuel injectors and thus port fuel injector 170 may not be included in the engine system.

Fuel injector 170 and fuel injector 166 are shown coupled to fuel rail 206. Fuel rail 206 may be coupled to fuel line 221. Fuel line 221 may be further coupled to fuel tank 240. The fuel line 221 may include a pressure relief valve 250. Additionally, a fuel pump 241 may be coupled to fuel tank 240 and fuel line 221. The fuel pump 241 may be a lift pump. Additionally, a higher pressure direct injection fuel pump 252 may be positioned in fuel line 221. In one example, as shown in FIG. 1, the fuel pump 252 is upstream of the fuel rail 206. In another example, the fuel pump 252 may be positioned downstream of the fuel rail 206 and proximate to the fuel injector 166 and/or fuel injector 170. In yet another example, each fuel injector may include a dedicated fuel injector fuel pump directly upstream of or incorporated into the corresponding fuel injector. In some embodiments, the dedicated fuel injector fuel pump may be in addition to or in place of fuel pump 252. In this way, one or more of fuel pump 241, fuel pump 252, and optionally dedicated fuel injector fuel pumps, may control the pressure of fuel injected into the cylinder 14 from the fuel injectors 170 and/or 166.

Further, a pressure relief valve 254 may be positioned in the fuel line 221, downstream of the fuel pump 252. In some embodiments, a pressure control valve may also be positioned downstream of the fuel pump 252. Fuel rail 206 may include a plurality of sensors, including a temperature sensor and a pressure sensor. Similarly, fuel line 221 and fuel tank 240 may include a plurality of sensors, including temperature and pressure sensors. Fuel tank 240 may also include a refueling port.

As discussed further below, the fuel pump 241 and or the fuel pump 252 may be configured to adjust a pressure of fuel being delivered along the fuel line 221, to the fuel rail 206, and to one or more of the fuel injectors 170 or 166. In some embodiments, the fuel pump 241 may act as a lift pump and the fuel pump 252 may be configured to adjust the pressure of fuel being delivered to one or more of the fuel injectors 170 and/or 166. As such, the fuel pump 252 may control a delivery pressure of the fuel being delivered to the cylinder 14 and/or port of the cylinder 14. The controller (e.g., such as controller 12 shown in FIG. 1) may adjust operation of the fuel pump 252 and/or the fuel pump 241 to deliver fuel to the cylinder 14 and/or the port of the cylinder 14 at a desired fuel delivery pressure and subsequently the desired phase (e.g., liquid or gas). For example, adjusting operation of the fuel pump 252 and/or fuel pump 241 may include adjusting pump operation to increase or decrease the fuel pressure.

The controller may further control operation of the pressure relief valve 250 and/or the pressure relief valve 254. For example, when transitioning from delivering fuel in a liquid phase to delivering fuel in a gaseous phase, the fuel pump 252 may be adjusted to decrease the pressure of the fuel being delivered along the fuel line 221. In order to quickly reduce the pressure and transition the phase of fuel in the fuel system 172, the controller may open the pressure relief valve 254 (and sometime pressure relief valve 250) for a duration. The duration may be based on an amount of time to reduce the fuel pressure to a pressure at which the fuel transitions into the gaseous phase.

The fuel tank 240 may contain a gaseous fuel such as LPG. In other embodiments, fuel tank 240 may contain another gaseous fuel, such as CNG, methane, hydrogen gas, etc. In embodiments where fuel tank 240 contains a gaseous fuel, a tank valve may be coupled to fuel line 221 upstream of fuel pump 241. Additionally, a line valve may be coupled to fuel line 221 upstream of the tank valve. A pressure regulator may also be coupled to fuel line 221 upstream of the line valve. Fuel line 221 may also be coupled to a coalescing filter and may further include a pressure relief valve upstream of fuel rail 206. For the methods described further below with regard to FIGS. 3-4, a gaseous fuel system including LPG is referenced. However, in alternate embodiments similar methods may be used in fuel systems including an alternative gaseous fuel such as CNG, methane, hydrogen gas, etc. In one example, the fuel tank 240 contains LPG in a liquid phase. Further, in this example, the fuel tank 240 may be the only fuel tank of the fuel system 172. Thus, the fuel tank 240 may be referred to as a single, liquid fuel tank. In another embodiment, the fuel system 172 may include more than one fuel tank. However, the more than one fuel tank may include LPG in the liquid phase such that both fuel tanks include LPG in the same phase. In yet another example, the fuel system 172 may be a dual fuel system including another type of fuel such as gasoline.

As shown in FIG. 2, the fuel system 172 includes a direct fuel injector 166 and a port fuel injector 170. In this example, each fuel injector 166 and 170 is configured to inject gaseous fuel in both a liquid phase and a gaseous phase. When transitioning between phases, for example from gas to liquid, there may be a period of time wherein the fuel is a mixture of the gaseous and liquid phases. During this transition period, the controller may adjust fuel injection parameters such as fuel pulse width to account for the transitioning phases, as discussed further below. In an alternate embodiment, each cylinder 14 may include two direct fuel injectors and/or two port fuel injectors. For example, each cylinder may include a first direct fuel injector for injecting gaseous fuel in the liquid phase and a second direct fuel injector for injecting gaseous fuel in the gaseous phase. As such, the fuel system 172 may include dedicated liquid phase fuel injectors and dedicated gaseous phase fuel injectors. In this embodiment, the first fuel injector may be part of a first gaseous system and the second fuel injector may be part of a second liquid system. As such, when transitioning between delivering fuel as liquid or gas, the transition period may be reduced or absent due to the separate liquid and gaseous systems. Further, the controller may not need to gradually adjust the pulse width during the transition since each separate liquid and gaseous fuel injector may have a different pulse width.

The system of FIGS. 1-2 provides for an engine cylinder, a first fuel injector coupled directly to the engine cylinder for injecting fuel into the engine cylinder, a fuel delivery system coupled to the engine cylinder via the first fuel injector, the fuel delivery system including a single fuel tank and a fuel pump configured to adjust a fuel delivery pressure, and a controller with computer readable instructions for adjusting the fuel pump to deliver fuel in a first phase at a first fuel delivery pressure during a first set of engine operating conditions and adjusting the fuel pump to deliver fuel in a second phase at a second fuel delivery pressure during a different, second set of engine operating conditions, the first fuel delivery pressure and the second delivery pressure based on a temperature and respective phase of the fuel. The system further includes a second fuel injector coupled to a port of the engine cylinder for injecting fuel into the port. The fuel delivery system is further coupled to the engine cylinder via the second fuel injector.

Gaseous fuel, such as LPG, may be delivered via a fuel delivery system (e.g., such as fuel system 172 shown in FIGS. 1-2) to engine cylinders and/or engine cylinder ports for combustion. LPG may be delivered in either a liquid phase or a gaseous phase. For example, LPG may be stored in a fuel tank (e.g., such as fuel tank 240 shown in FIG. 2) in liquid form. A fuel pump (e.g., such as fuel pump 241 and/or fuel pump 252 shown in FIG. 2) may then pump the LPG from the fuel tank and to the fuel delivery lines, fuel rail, and fuel injectors (e.g., such as fuel line 221, fuel rail 206, and fuel injectors 170 and/or 166). A pressure of the LPG in the fuel delivery lines (e.g., the fuel delivery pressure) may determine the phase of the LPG. For example, at a constant fuel temperature, LPG may be in a liquid phase at a first pressure and in a gaseous phase at a second pressure, the first pressure higher than the second pressure. More specifically, at a constant temperature, increasing a pressure of the LPG above a threshold converts LPG from the gaseous phase to the liquid phase. Conversely, at a constant fuel temperature, decreasing a pressure of the LPG below the threshold transitions the LPG from the liquid phase to the gaseous phase. The threshold may be a threshold pressure, at the specific fuel temperature, at which LPG transitions from liquid to gas or gas to liquid.

The phase of LPG at a given temperature and pressure may be further based on the composition of the LPG. As introduced above, LPG is a mixture of butane and propane. Different compositions of LPG contain different ratios or percentages of butane and propane. In one example, a composition of LPG may contain 60% propane and 40% butane. In another example, a composition of LPG may contain 80% propane and 20% butane. As the composition of LPG changes, a pressure-temperature relationship of the LPG changes, thereby changing a phase diagram of the LPG. Thus, at one temperature, LPG may transition between liquid and gaseous phases at a different pressure for different compositions of LPG.

The phase of LPG delivered to engine cylinders may be further based on a temperature and pressure of the engine cylinder in which the LPG is being injected into. For example, if the temperature of the cylinder is at a high enough temperature, liquid LPG injected into the cylinder may be converted to gaseous LPG (e.g., vapor) upon entering the cylinder.

A desired fuel phase (e.g., phase of LPG) for fuel injection may be determined based on engine operating conditions. For example, under a first set of conditions, it may be desired to inject LPG in a gaseous phase. In one example, the first set of conditions may include a cold start condition wherein engine temperatures are below a threshold. Injecting LPG in a gaseous phase during the cold start condition may reduce particulate matter (e.g., soot) formation. Additionally, the first set of conditions may include during certain injection timings wherein increased soot formation may occur (e.g., an amount of soot formation over a threshold level). In another example, the first set of conditions may include a condition wherein increased mixing in the cylinder and/or complete combustion is required. Additionally, the first set of conditions may include lower engine loads and/or lower engine speeds.

Under a second, different set of conditions, it may be desired to inject LPG in a liquid phase. In one example, the second set of conditions may include a hot start condition where engine temperatures are above a threshold. In another example, the second set of conditions may include an intake air or charge air temperature greater than a threshold temperature. In this example, increased cooling of the charge air may be required to reduce engine knock. Injecting LPG into the cylinders in the liquid phase may provide additional cooling, thereby reducing likelihood for knock. Thus, the second set of conditions may include conditions with an increased chance of engine knock.

In this way, based on engine operating conditions, an engine controller (e.g., such as controller 12 shown in FIG. 1) may determine the desired fuel phase of the LPG. Then, based on the temperature of the LPG in the fuel delivery system, the controller may determine the required pressure (e.g., delivery pressure) to deliver the LPG in the desired phase. As discussed above, the pressure-temperature relationship of the LPG may be based on a composition of the LPG. In one example, a composition of the LPG may be known and a pressure-temperature table or map may be stored in the controller. Then, based on the desired LPG phase and LPG temperature, the controller may look up the required fuel delivery pressure in the pressure-temperature map. In another example, the composition of the LPG may be measured or estimated. In this example, a look-up table stored in the controller may include LPG composition, temperature, and pressure. Then, based on the desired LPG phase, LPG temperature, and approximate LPG composition, the controller may look up the required fuel delivery pressure in the look-up table. In yet another example, the composition of the LPG may not be known. In this case, a pressure-temperature map or table may be included for a range of fuel compositions. For example, if the desired LPG phase is the liquid phase, the controller may look up the minimum fuel pressure at which the LPG is maintained in the liquid phase for a range of LPG compositions at the current fuel temperature.

The determined fuel delivery pressure may be further based on a pressure and/or temperature of the cylinder in which the LPG is being injected into. As described above, the temperature and/or pressure of the cylinder may change the phase of the LPG upon injection of the LPG into the cylinder. Thus, the determined fuel delivery pressure may be further adjusted to maintain LPG in the desired phase after injecting the LPG into the cylinder.

After determining the desired fuel delivery pressure, the controller may adjust the LPG pressure by adjusting operation of a fuel pump in the fuel delivery system, such as fuel pump 252 and/or fuel pump 241 shown in FIG. 2. Adjusting operation of the fuel pump may include adjusting the fuel pump to increase or decrease a pressure of the fuel exiting the pump. For example, the controller may adjust the fuel pump to deliver the LPG at the determined fuel delivery pressure. Adjusting the pressure output of the fuel pump may then adjust the phase of the LPG downstream of the fuel pump. After adjusting the fuel delivery pressure and phase of the LPG, the controller may adjust additional engine operating conditions. For example, additional fuel injection parameters such as a fuel injection amount may be adjusted based on the phase of the LPG. Specifically, a larger amount (e.g., volume) of LPG may be injected if the LPG is in the gaseous phase compared to the liquid phase. For example, the controller may adjust the amount of time the injector remains open and injecting fuel (e.g., the pulse width of the injector). Thus, the pulse width may be based on the phase of the fuel being injected. The pulse width may be longer for gaseous fuel than for liquid fuel.

In this way, a method for an engine comprises adjusting a fuel pressure in a fuel delivery system to deliver fuel in each of a liquid and a gaseous phase during different engine operating conditions, the fuel pressure based on a temperature and a desired phase of the fuel. Adjusting the fuel pressure includes adjusting operation of a fuel pump in the fuel delivery system to deliver fuel to fuel injectors at the fuel pressure. In one example, adjusting the fuel pressure includes increasing the fuel pressure above a threshold pressure to transition from delivering the fuel in the gaseous phase to delivering the fuel in the liquid phase. In another example, adjusting the fuel pressure includes decreasing the fuel pressure below the threshold pressure to transition from delivering the fuel in the liquid phase to the gaseous phase, the threshold pressure based on the fuel pressure for the temperature of the fuel at which the fuel transitions between the liquid phase and the gaseous phase and a composition of the fuel.

The fuel pressure is further based on temperature and pressure of an engine cylinder, the temperature and pressure of the engine cylinder being one of a measured temperature and pressure or an estimated temperature and pressure based on charge air temperature, air charge and cylinder volume (during the injection) derived from crankshaft position, and piston position relative to the crankshaft position. The method further comprises adjusting the fuel pressure to deliver fuel in the liquid phase in response to a charge air temperature above a threshold temperature. Additionally, the method comprises adjusting the fuel pressure to deliver fuel in the gaseous phase in response to one or more of an engine temperature below a threshold temperature, an engine speed below a threshold speed, or an engine load below a threshold load, or the engine operating under a special condition such as a cold start or hot restart.

The method further includes adjusting an amount of fuel injected into an engine cylinder based on the fuel pressure and whether the fuel is injected in the gaseous phase or the liquid phase. As discussed above, in one example, the fuel is liquefied petroleum gas (LPG) and the LPG is stored in a single fuel tank in the liquid phase.

Turning now to FIG. 3, a method 300 is shown for adjusting a fuel phase of a gaseous fuel based on engine operating conditions. Specifically, a fuel pressure in a fuel delivery system, such as the fuel system 172 shown in FIGS. 1-2) may be adjusted to deliver fuel in either a liquid or a gaseous phase during different engine operating conditions. As discussed above, the fuel pressure may be based on a temperature and a desired phase of the fuel. Instructions for executing method 300 may be stored on an engine controller, such as controller 12 shown in FIG. 2. The method below is described with reference to an LPG fuel system. However, in alternate embodiments, the method may be used in an engine with an alternate gaseous fuel system, such as a CNG fuel system. In yet other embodiments, the method may be used in an engine with a dual fuel system. The dual fuel system may include a gaseous fuel system and another type of fuel system.

The method begins at 302 by estimating and/or measuring engine operating conditions. Engine operating conditions may include engine speed and load, engine temperatures, charge air temperature, fuel system conditions (e.g., fuel pressure, fuel temperature, fuel pump settings), engine cylinder temperature and pressure, injection timing, etc. At 304, the method includes determining a desired fuel phase of the LPG. As described above, the desired fuel phase may be based on engine operating conditions. In one example, the desired fuel phase may be the gaseous phase during a cold start condition and/or when a speed and/or load are under a threshold speed and/or load. In another example, the desired fuel phase may be the gaseous phase when engine speed is above a second threshold speed. The desired fuel phase may be the gaseous phase during other conditions wherein increased cylinder mixing, increased chance of complete combustion, and/or decreased particulate matter formation is required. In another example, the desired fuel phase may be the liquid phase during a hot start condition and/or when a charge air temperature (e.g., the temperature of the air entering the cylinder) is greater than a threshold temperature. The threshold temperature may be based on a temperature at which the likelihood of engine knock is increased. As such, the desired fuel phase may be the liquid phase during conditions with an increased likelihood of knock.

At 306, the method includes determining the desired fuel delivery pressure based on the desired fuel phase, the current fuel temperature, and the pressure and temperature in the cylinder at time of injection. As described above, the controller may include a look-up table including fuel pressures based on fuel temperature and/or fuel composition. For example, the desired fuel delivery pressure may be based on the LPG temperature and the LPG composition, or a range of possible LPG compositions. In one example, the LPG temperature is a measured temperature in the LPG fuel system. Thus, the method at 306 may include looking up the fuel delivery pressure in a look-up table in the controller. In some examples, the method at 306 may include modifying the determined fuel delivery pressure based on a temperature and/or pressure of the cylinder(s). For example, if the desired fuel phase is the liquid fuel phase, the desired fuel delivery pressure may be a first pressure. However, if the temperature of the engine cylinder is at a temperature higher than a liquid-gas transition temperature, the LPG may transition into the gas phase once it is injected into the cylinder. As such, the controller may adjust the fuel delivery pressure to a second pressure, the second pressure higher than the first pressure, to maintain the LPG in the liquid phase upon injection into the cylinder. The temperature and pressure of the cylinder may be one of a measured temperature and pressure or an estimated temperature and pressure based on air charge temperature. For example, if the temperature and/or pressure of the cylinder cannot be measured, these values may be estimated based on the air charge temperature, air charge mass, and cylinder volume at time of injection. In other examples, a model of cylinder temperature and pressure may be used to adjust the determined LPG pressure, the model based on air charge temperature and additional engine operating conditions such as cylinder air charge and cylinder volume (based on crankshaft and/or piston position).

At 308, the method includes determining if the fuel (e.g., LPG) is in the desired fuel phase (e.g., liquid or gas). In some examples, the phase of the LPG may be measured. In other examples, the phase of the LPG may be inferred based on the temperature and pressure of the LPG. If the LPG is in the desired fuel phase, the method continues on to 310 to maintain the fuel pump operation and thereby maintain the LPG in the desired phase. For example, if the desired fuel phase is the gaseous phase and the LPG is determined to be in the gaseous phase, the controller may maintain pump operation, thereby maintaining the fuel delivery pressure and maintaining the LPG in the gaseous phase. In other examples, the LPG may be in the desired phase; however, the LPG may be close to transitioning to the undesired phase. In this example, pump operation at 310 may be adjusted slightly to maintain the LPG is the desired phase for the current LPG temperature. This may move the LPG pressure further away from a threshold, or transitional pressure at which the LPG changes phases.

Alternatively at 308, if the LPG is not is the desired fuel phase, the method continues on the 312. At 312, the controller may adjust the fuel pump to deliver the fuel at the desired fuel delivery pressure, as determined at 306. Adjusting the fuel pump to deliver the fuel at the desired pressure may thereby transition the fuel from an initial phase to the desired phase. The initial phase may be the phase of the LPG prior to fuel pump adjustment. In one example, the initial phase may be the liquid phase and the desired phase may be the gaseous phase. In this example, the controller may adjust the fuel pump to decrease the LPG fuel delivery pressure (e.g., LPG pressure downstream of the fuel pump) below a threshold pressure. The threshold pressure may be the fuel pressure for the current fuel temperature at which the LPG transitions from the liquid phase to the gaseous phase. In another example, the initial phase may be the gaseous phase and the desired phase may be the liquid phase. In this example, the controller may adjust the fuel pump to increase the LPG fuel delivery pressure above the threshold pressure.

At 314, the method may include adjusting fuel injection based on the desired fuel phase. For example, a larger amount (e.g., volume) of LPG may be injected if the LPG is in the gaseous phase compared to the liquid phase. In another example, the pulse width (e.g., amount of time the injector is open) may be adjusted. For example, the pulse width may be longer when injecting fuel in the gaseous phase than in the liquid phase. In other embodiments, additional engine operating parameters may be adjusted at 314 based on the desired fuel phase. For example, spark parameters such as spark timing and/or ignition energy delivered by the spark may be adjusted based on whether the LPG is in the liquid phase or gaseous phase.

In yet another example, the method at 314 may include adjusting injection timing based on the phase of the fuel being injected. For example, in a naturally aspirated engine (e.g., with no boost system), gaseous port fuel injection may reduce power since the fuel in gaseous form takes up more space than liquid fuel, thereby reducing volumetric efficiency. In a port fuel injection/direct injection normally aspirated system, direct injection may be used at high power demand to inject fuel after the intake and exhaust valves are closed. As a result, less air in the cylinder may be displaced, thereby enabling the engine to maintain increased volumetric efficiency and not suffer power loss.

FIG. 4 shows a graphical example of adjusting fuel delivery pressure to change the phase in which the fuel is delivered to fuel injectors of a fuel delivery system. Specifically, graph 400 shows changes in fuel delivery pressure at plot 402, changes in fuel temperature at plot 404, changes in the fuel phase at plot 406, changes in cylinder temperature at plot 408, changes in engine temperature at plot 410, changes in charge air temperature at plot 412, and changes to fuel injection at plot 414. As discussed above, in one example the fuel is a gaseous fuel such as LPG and the fuel delivery system includes a single liquid fuel tank filled with LPG in the liquid phase (such as fuel tank 240 of fuel system 172 shown in FIG. 2). In this example, the fuel delivery system does not include an additional fuel tank filled with LPG in the gaseous phase (e.g., gaseous petroleum gas). However, in some examples, the fuel delivery system may include additional fuel tanks filled with LPG in the liquid phase.

The fuel delivery system includes a fuel pump for adjusting the pressure of the LPG in the fuel delivery system downstream of the fuel pump. This pressure may be referred to herein as the fuel delivery pressure. The fuel delivery pressure may be based on the temperature of the LPG in the fuel delivery system, the desired phase of the LPG (e.g., liquid or gas), the composition of the LPG (e.g., ratio of propane to butane) and, in some examples, the temperature and/or pressure of the engine cylinders. The desired phase of the LPG may be based on various engine operating conditions, as described above. In the example shown in FIG. 4, the desired LPG phase is determined based on engine temperature and charge air temperature (e.g., temperature of the air entering the cylinders for combustion). In alternate examples, additional or alternative engine operating conditions may be used to determine the desired LPG fuel phase.

Additionally, graph 400 shows adjustments to fuel injection at plot 414. Adjustments to fuel injection may be shown by a change in the amount of fuel being injected which may correspond to a change in pulse width of the fuel injectors.

In this example, a single fuel injector may inject fuel in the liquid phase and the gaseous phase. As described further below, the pulse width and amount of fuel injected may be larger when the fuel is in the gaseous phase than when the fuel is in the liquid phase. In another embodiment, each cylinder may include two corresponding fuel injectors, a first injector for injecting fuel in the liquid phase and a second injector for injecting fuel in the gaseous phase.

Prior to time 1, the fuel (e.g., LPG) in the fuel delivery system is in the liquid phase (plot 406). Also, the engine may be in a cold start condition, as indicated by an engine temperature below a threshold temperature, T1 (plot 410). In response to the cold start condition, an engine controller determines the desired fuel phase is the gaseous phase. The controller adjusts the fuel pump at time t1 to decrease the fuel delivery pressure (plot 402) and thereby transition the fuel from the liquid phase to the gaseous phase (plot 406). At time t2, the fuel delivery pressure is at the desired pressure and the fuel is in the gaseous phase. The final fuel delivery pressure at time t2 may be based on the desired gaseous fuel phase, along with the fuel temperature (404) and the cylinder temperature (408). In some embodiments, the fuel delivery pressure may only be based on the fuel temperature and a composition of the fuel. In other embodiments, as shown in FIG. 4, the fuel delivery pressure may be based on the fuel temperature, the composition of the fuel, and the cylinder temperature. The fuel delivery pressure may also be based on additional parameters such as cylinder pressure.

Before time t1, the fuel injectors are injecting fuel at a first pulse width 416 corresponding to a first amount of fuel. After transitioning the fuel from the liquid phase to the gaseous phase, the fuel injectors inject fuel at a second pulse width 418 corresponding to a second amount of fuel. The second pulse width 418 and the second amount of fuel are larger than the first pulse width 216 and the first amount of fuel. Between time t1 and time t2 the fuel system transitions from injecting fuel in the liquid phase to injecting fuel in the gaseous phase. During this time, the pulse width may gradually increase from the first pulse width 416 to the second pulse width 418. In an alternate embodiment, dedicated fuel injectors for injecting fuel in the liquid phase and injecting fuel in the gaseous phase may be used. In this embodiment, there may be a smaller transition period between the liquid phase and the gaseous phase.

At time t3 engine temperature increases above the threshold temperature T1 such that the engine is no longer in the cold start condition. At time t4, the charge air temperature increases above a threshold temperature, T2 (plot 412). In response, the controller adjusts the fuel pump to increase the fuel delivery pressure (plot 402) and transition the fuel in the fuel delivery system from the gaseous phase to the liquid phase. Since the fuel temperature is at a higher level at time t4 than time t1, the increase in fuel delivery pressure may be higher than it would have been at time t1. At time t5, the fuel has transitioned completely to the liquid phase (plot 406). At time t6, the cylinder temperature increases (plot 408). As a result, the controller may adjust the fuel pump to further increase the fuel delivery pressure to maintain the fuel in the liquid phase. For example, increasing the fuel delivery pressure in this way may ensure that the fuel remains in the liquid phase once it is injected into the cylinder for combustion.

As shown at FIG. 4, a method includes, during a first condition, adjusting a fuel pump to deliver fuel from a fuel tank and to a fuel injector in a first phase. In one example, the first condition includes one or more of a cold start condition, conditions requiring increased mixing in a combustion chamber (e.g., cylinder), or conditions requiring complete combustion. The method further includes, during a second condition, adjusting the fuel pump to deliver fuel from the fuel tank and to the fuel injector in a second phase, the second phase different from the first phase. In one example, the second condition includes one or more of a condition requiring increased charge air cooling or a condition with an increased likelihood of engine knock.

In the example shown in FIG. 4, the first phase is a gaseous phase and the second phase is a liquid phase. As shown at time t4, the method includes transitioning from the first phase to the second phase by adjusting the fuel pump to increase a fuel delivery pressure, the transitioning from the first phase to the second phase responsive to a charge air temperature greater than a threshold temperature, the threshold temperature based on a temperature increasing the likelihood for engine knock. As shown at time t1, the method includes transitioning from the second phase to the first phase by adjusting the fuel pump to decrease a fuel delivery pressure, the transitioning from the second phase to the first phase responsive to one or more of a cold start condition, a decreased engine speed, or a decreased engine load.

In one example, adjusting the fuel pump to deliver fuel in the first phase includes adjusting the fuel pump to deliver fuel at a first fuel delivery pressure, the first fuel delivery pressure based on the first phase and a temperature of the fuel and further comprising adjusting the first fuel delivery pressure based on cylinder temperature and pressure. In another example, adjusting the fuel pump to deliver fuel in the second phase includes adjusting the fuel pump to deliver fuel at a second fuel delivery pressure, the second fuel delivering pressure based on the second phase and a temperature of the fuel and further comprising adjusting the second fuel delivery pressure based on cylinder temperature and pressure.

As discussed above, the fuel tank may be a single fuel tank for a fuel system and the fuel tank may contain liquefied petroleum gas (LPG). Additionally, the fuel injector may be one or more of a direct fuel injector or a port fuel injector.

In this way, a gaseous fuel may be delivered to fuel injectors of a fuel system in each of a liquid phase and gaseous phase based on different engine operating conditions. The gaseous fuel may be stored in a liquid fuel tank, the fuel tank being the only fuel tank of the fuel system. In other embodiments, the fuel system may contain more than one liquid fuel tank, but all of the liquid fuel tanks may store the fuel in the same phase (e.g., the liquid phase). As described above, in one example, the gaseous fuel is LPG. Under a first set of engine operating conditions, the LPG may be injected in the gaseous phase. The first set of conditions may include a cold start condition and/or conditions of decreased engine speed and/or load. As a result of combusting LPG in the gaseous phase during these conditions, particulate matter formation may be reduced while increasing the chance of more complete combustion. Under a second, different set of engine operating conditions, the LPG may be injected in the liquid phase. The second set of conditions may include a hot start conditions and/or a charge air temperature greater than a threshold temperature. As a result of injecting the LPG in the liquid phase, the liquid LPG may provide additional charge air cooling, thereby reducing engine knock. As described above, an engine controller may adjust a fuel pump in the fuel system to adjust the fuel delivery pressure of the LPG, thereby adjusting the phase of the LPG. Thus, a technical effect is achieved by adjusting the fuel delivery pressure to deliver fuel in the desired phase, the desired phase based on engine operating conditions. As a result of delivering fuel in the liquid phase and the gaseous phase under different engine operating conditions, engine efficiency may be increased while reducing engine knock and particulate matter formation.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling an engine, comprising:
   adjusting a fuel pressure of fuel in a fuel delivery system downstream of a fuel pump by adjusting a fuel pump output pressure to change a phase of the fuel downstream of the fuel pump, and selectively delivering the fuel which has been changed in phase downstream of the fuel pump to fuel injectors in each of a liquid phase and a gaseous phase during different engine operating conditions, the fuel pressure adjusted based on a temperature of the fuel and a desired phase of the fuel,
   wherein adjusting the fuel pressure includes adjusting operation of the fuel pump in the fuel delivery system to deliver fuel to the fuel injectors at the fuel pressure by adjusting the pump output pressure via a pressure control valve, and
   wherein the fuel is liquefied petroleum gas (LPG) and the LPG is stored in a single fuel tank in the liquid phase, the method further comprising, responsive to transitioning the fuel between phases, adjusting a fuel injection pulse width for a period to account for the fuel being a mixture of gaseous and liquid phases.

2. The method of claim 1, wherein adjusting the fuel pressure includes increasing the fuel pressure above a threshold pressure to transition from delivering the fuel to the fuel injectors in the gaseous phase to delivering the fuel to the fuel injectors in the liquid phase.

3. The method of claim 2, wherein adjusting the fuel pressure includes decreasing the fuel pressure below the threshold pressure to transition from delivering the fuel to the fuel injectors in the liquid phase to the gaseous phase, the threshold pressure based on the fuel pressure for the temperature of the fuel at which the fuel transitions between the liquid phase and the gaseous phase and a composition of the fuel.

4. The method of claim 1, wherein the fuel pressure is further based on temperature and pressure of an engine cylinder, the temperature and pressure of the engine cylinder being one of a measured temperature and pressure or an estimated temperature and pressure based on charge air temperature, air charge and cylinder volume derived from crankshaft position, and piston position relative to the crankshaft position.

5. The method of claim 1, further comprising adjusting the fuel pressure to deliver fuel to the fuel injectors in the liquid phase in response to a charge air temperature determined to be above a threshold temperature.

6. The method of claim 1, further comprising adjusting the fuel pressure to deliver fuel to the fuel injectors in the gaseous phase in response to one or more of an engine temperature determined to be below a threshold temperature, an engine speed determined to be below a threshold speed, or an engine load determined to be below a threshold load.

7. The method of claim 1, further comprising adjusting an amount of fuel injected into an engine cylinder based on the fuel pressure and whether the fuel is injected in the gaseous phase or the liquid phase.

8. The method of claim 1, wherein the fuel injection pulse width is larger for fuel that is in the gaseous phase than for fuel that is in the liquid phase.

9. An engine control method, comprising:
   during a first condition, adjusting a fuel pump output pressure to increase fuel pressure downstream of a fuel pump to change a phase of fuel downstream of the fuel pump from a second phase to a first phase and deliver fuel to a fuel injector in the first phase;
   during a second condition, adjusting the fuel pump output pressure to decrease fuel pressure downstream of the fuel pump to change the phase of fuel downstream of the fuel pump from the first phase to the second phase and deliver the fuel to the fuel injector in the second phase, the second phase different from the first phase; and
   adjust a fuel injection pulse width during each transition from the first phase to the second phase, and the second phase to the first phase, while fuel injected is a mixture of the phases.

10. The method of claim 9, wherein the first phase is a gaseous phase and the second phase is a liquid phase, and wherein adjusting the fuel pump output pressure includes adjusting a pressure valve coupled to the pump.

11. The method of claim 10, wherein the first condition includes one or more of a cold start condition, conditions requiring increased mixing in a combustion chamber, or conditions requiring complete combustion.

12. The method of claim 10, wherein the second condition includes one or more of conditions requiring increased charge air cooling or conditions with an increased likelihood of engine knock.

13. The method of claim 10, further comprising transitioning from the first phase to the second phase by adjusting the fuel pump to increase a fuel delivery pressure, the transitioning from the first phase to the second phase responsive to a charge air temperature greater than a threshold temperature, the threshold temperature based on a temperature increasing likelihood for engine knock.

14. The method of claim 10, further comprising transitioning from the second phase to the first phase by adjusting the fuel pump to decrease a fuel delivery pressure, the transitioning from the second phase to the first phase responsive to one or more of a cold start condition, an engine speed, or a decreased engine load.

15. The method of claim 9, wherein adjusting the fuel pump to deliver fuel in the first phase includes adjusting the fuel pump to deliver fuel at a first fuel delivery pressure, the first fuel delivery pressure based on the first phase and a temperature of the fuel and further comprising adjusting the first fuel delivery pressure based on cylinder temperature and pressure.

16. The method of claim 9, wherein adjusting the fuel pump to deliver fuel in the second phase includes adjusting the fuel pump to deliver fuel at a second fuel delivery pressure, the second fuel delivery pressure based on the second phase and a temperature of the fuel and further comprising adjusting the second fuel delivery pressure based on cylinder temperature and pressure.

17. The method of claim 9, wherein the fuel is stored in a fuel tank that is a single fuel tank for a fuel system, wherein the fuel tank contains liquefied petroleum gas (LPG), and wherein the fuel injector is one or more of a direct fuel injector or a port fuel injector.

18. A system for an engine, comprising:
an engine cylinder;
a first fuel injector coupled directly to the engine cylinder for injecting fuel into the engine cylinder;
a fuel delivery system coupled to the engine cylinder via the first fuel injector, the fuel delivery system including a single fuel tank and a fuel pump configured to adjust a fuel delivery pressure; and
a controller with computer readable instructions for adjusting the fuel pump to deliver fuel in a first phase at a first fuel delivery pressure during a first set of engine operating conditions and adjusting the fuel pump to deliver fuel in a second phase at a second fuel delivery pressure during a different, second set of engine operating conditions, the first fuel delivery pressure and the second fuel delivery pressure based on a temperature of the fuel and respective phase of the fuel, and for adjusting a fuel injection pulse width during each transition from the first phase to the second phase, and the second phase to the first phase, the fuel injected being a mixture of the phases during transitions.

19. The system of claim 18, further comprising a second fuel injector coupled to a port of the engine cylinder for injecting fuel into the port and wherein the fuel delivery system is further coupled to the engine cylinder via the second fuel injector and wherein the controller includes computer readable instructions for injecting the fuel from the second fuel injector when both and intake valve and exhaust valve of the engine cylinder are closed when the fuel is in a gaseous phase.

* * * * *